United States Patent
Kim et al.

(10) Patent No.: US 11,482,042 B2
(45) Date of Patent: Oct. 25, 2022

(54) USER AUTHENTICATION APPARATUS, USER AUTHENTICATION METHOD AND TRAINING METHOD FOR USER AUTHENTICATION

(71) Applicant: Samsung Electronics Co., Ltd., Suwon-si (KR)

(72) Inventors: Heewon Kim, Seoul (KR); Seon Min Rhee, Seoul (KR); Jihye Kim, Anyang-si (KR); Ju Hwan Song, Suwon-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 16/875,368

(22) Filed: May 15, 2020

(65) Prior Publication Data

US 2021/0192187 A1    Jun. 24, 2021

(30) Foreign Application Priority Data

Dec. 18, 2019 (KR) .................. 10-2019-0169581

(51) Int. Cl.
*G06V 40/16* (2022.01)
*G06T 7/50* (2017.01)
(Continued)

(52) U.S. Cl.
CPC ........... *G06V 40/172* (2022.01); *G06F 21/32* (2013.01); *G06K 9/627* (2013.01); *G06K 9/6215* (2013.01);
(Continued)

(58) Field of Classification Search
CPC ........... G06K 9/00288; G06K 9/00268; G06K 9/6202; G06K 9/6215; G06K 9/6256;
(Continued)

(56) References Cited

U.S. PATENT DOCUMENTS 9,384,385 B2    7/2016    Park et al.
9,799,140 B2    10/2017   Hwang et al.
(Continued)

FOREIGN PATENT DOCUMENTS

KR    10-2016-0018099 A    2/2016
KR    10-1854048 B1        5/2018
(Continued)

OTHER PUBLICATIONS

Extended European search Report dated Jan. 27, 2021 for corresponding EP Application No. 20187330.4 (8 pages in English).
(Continued)

*Primary Examiner* — Edward F Urban
*Assistant Examiner* — Wassim Mahrouka
(74) *Attorney, Agent, or Firm* — NSIP Law

(57) ABSTRACT

A user authentication method and a user authentication apparatus acquire an input image including a frontalized face of a user, calculate a confidence map including confidence values, for authenticating the user, corresponding to pixels with values maintained in a depth image of the frontalized face of the user among pixels included in the input image, extract a second feature vector from a second image generated based on the input image and the confidence map, acquire a first feature vector corresponding to an enrolled image, and perform authentication of the user based on a correlation between the first feature vector and the second feature vector.

18 Claims, 11 Drawing Sheets

(51) Int. Cl.
  *G06F 21/32* (2013.01)
  *G06K 9/62* (2022.01)
  *G06N 3/08* (2006.01)
  *G06V 10/75* (2022.01)
(52) U.S. Cl.
  CPC ............. *G06K 9/6256* (2013.01); *G06N 3/08* (2013.01); *G06T 7/50* (2017.01); *G06V 10/751* (2022.01); *G06V 40/168* (2022.01); *G06T 2207/10028* (2013.01); *G06T 2207/20081* (2013.01); *G06T 2207/20084* (2013.01); *G06T 2207/30201* (2013.01)
(58) Field of Classification Search
  CPC ............... G06K 9/627; G06K 9/00208; G06K 9/00248; G06K 9/4628; G06K 9/00221; G06F 21/32; G06N 3/08; G06T 7/50; G06T 2207/10028; G06T 2207/20081; G06T 2207/20084; G06T 2207/30201
  See application file for complete search history.

(56) References Cited

U.S. PATENT DOCUMENTS

| | | |
|---|---|---|
| 2008/0193020 A1 | 8/2008 | Sibiryakov et al. |
| 2018/0240265 A1 | 8/2018 | Yang et al. |
| 2019/0014999 A1 | 1/2019 | Yuen et al. |
| 2020/0065564 A1* | 2/2020 | Romdhani ............... G06N 3/04 |
| 2020/0265219 A1* | 8/2020 | Liu ..................... G06K 9/00288 |
| 2020/0272806 A1* | 8/2020 | Walker ................. G06K 9/6271 |

FOREIGN PATENT DOCUMENTS

| | | | |
|---|---|---|---|
| WO | WO 2016/107638 A1 | 7/2016 | |
| WO | WO-2016107638 A1 * | 7/2016 | ......... G06K 9/00214 |

OTHER PUBLICATIONS

Deng, Weihong, et al. "Lighting-aware face frontalization for unconstrained face recognition." *Pattern Recognition* 68 (2017): 260-271. (12 pages in English).

Deng et al., "Lighting-aware face frontalization for unconstrained face recognition," Pattern Recognition, Elsevier, 2017, pp. 260-271.

Yin et al., "Towards Large-Pose Face Frontalization in the Wild," ICCV paper, provided by the Computer Vision Foundation, pp. 3990-3999.

Banerjee et al., "To Frontalize or Not to Frontalize: Do We Really Need Elaborate Pre-processing to Improve Face Recognition?" Mar. 27, 2018, 10 pages.

Hassner et al., "Effective Face Frontalization in Unconstrained Images," CVPR2015 paper, provided by the Computer Vision Foundation, pp. 4295-4304.

* cited by examiner

USER AUTHENTICATION APPARATUS, USER AUTHENTICATION METHOD AND TRAINING METHOD FOR USER AUTHENTICATION

CROSS-REFERENCE TO RELATED APPLICATIONS

This application claims the benefit under 35 USC § 119(a) of Korean Patent Application No. 10-2019-0169581, filed on Dec. 18, 2019, in the Korean Intellectual Property Office, the entire disclosure of which is incorporated herein by reference for all purposes.

BACKGROUND

1. Field

The following description relates to a user authentication apparatus, a user authentication method, and a training method for a user authentication.

2. Description of Related Art

To increase a recognition rate of a three-dimensional (3D) face, a frontalization method using a face frontalized by rotating a user's side face may be used. In the frontalization method, it is impossible to place a face at a desired position of a 3D model when a feature point of the face is not accurately detected. Also, an image may be distorted due to a portion of the frontalized face that does not include depth information, and the recognition rate of the 3D face may be affected by the above distortion. To solve the above issues, a soft symmetry method of filling the portion of the frontalized face with a facial portion at an opposite side including the depth information may be used. However, in the soft symmetry method, a recognition performance may be reduced due to artifacts caused by a symmetry when a landmark of an end of a nose is not accurately detected from a side pose image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method includes acquiring an input image including a frontalized face of a user, calculating a second confidence map including confidence values, for authenticating the user, corresponding to pixels with values maintained in a depth image of the frontalized face of the user among pixels included in the input image, extracting a second feature vector from a second image generated based on the input image and the second confidence map, acquiring a first feature vector corresponding to an enrolled image, and performing authentication of the user based on a correlation between the first feature vector and the second feature vector.

The input image may include the pixels with the values maintained in the depth image of the frontalized face of the user.

The first feature vector may be extracted from a first image generated based on the enrolled image and a first confidence map corresponding to the enrolled image and may be stored in advance.

The calculating of the second confidence map may include calculating the second confidence map corresponding to the input image using a neural network that outputs a confidence map including confidence values, for authenticating a user included in a training image, corresponding to pixels with values maintained in a depth image of a frontalized face of the user included in the training image among pixels included in the training image.

The extracting of the second feature vector may include generating the second image implying a depth confidence and depth information of each pixel, through an operation performed between the input image and the second confidence map, and extracting the second feature vector from the second image.

The performing of the authentication of the user may include comparing a similarity value between the first feature vector and the second feature vector to a predetermined threshold.

The performing of the authentication of the user may include calculating a similarity value between the first feature vector and the second feature vector.

The method may further include initially performing authentication of the user based on a correlation between a first feature extracted from the enrolled image and a second feature extracted from the input image.

The performing of the authentication of the user based on the correlation between the first feature vector and the second feature vector may include, in response to the initially performed authentication of the user failing, secondarily performing authentication of the user.

The first feature and the first feature vector may be stored in advance in an enrollment database.

In another general aspect, a method includes acquiring a training image pair including a frontalized face of a user, calculating, using a first neural network, a first confidence map including confidence values, for authenticating a user included in a first training image, corresponding to pixels with values maintained in a depth image of the frontalized face of the user among pixels included in the first training image, calculating, using a second neural network, a second confidence map including confidence values, for authenticating a user included in a second training image, corresponding to pixels with values maintained in the depth image of the frontalized face of the user among pixels included in the second training image, extracting a first feature vector from a first image generated based on the first training image and the first confidence map, extracting a second feature vector from a second image generated based on the second training image and the second confidence map, and updating the first neural network and the second neural network based on a correlation between the first feature vector and the second feature vector.

The first neural network and the second neural network may share parameters with each other.

The updating of the first neural network and the second neural network may include calculating a similarity value between the first feature vector and the second feature vector, and updating parameters of the first neural network and the second neural network using a loss function that is based on the similarity value.

The updating of the first neural network and the second neural network may include, in response to a user of the first training image and a user of the second training image being the same, updating parameters of the first neural network and the second neural network to output a confidence map that increases a similarity value between the first feature vector and the second feature vector, and in response to the user of the first training image and the user of the second training image being different from each other, updating parameters of the first neural network and the second neural network to output a confidence map that reduces the similarity value between the first feature vector and the second feature vector.

At least one of the first training image and the second training image may include pixels with values maintained in the depth image of the frontalized face of the user.

The extracting of the first feature vector may include generating the first image through an operation performed between the first training image and the first confidence map, and extracting the first feature vector from the first image.

The extracting of the second feature vector may include generating the second image implying a depth confidence and depth information of each pixel, through an operation performed between the second training image and the second confidence map, and extracting the second feature vector from the second image.

In another general aspect, a user authentication apparatus includes a communication interface configured to acquire an input image including a frontalized face of a user and a first feature vector corresponding to an enrolled image, and a processor configured to calculate a second confidence map including confidence values, for authenticating the user, corresponding to pixels with values maintained in a depth image of the frontalized face of the user among pixels included in the input image, configured to extract a second feature vector from a second image generated based on the input image and the second confidence map, and configured to perform authentication of the user based on a correlation between the first feature vector and the second feature vector.

The input image may include the pixels with the values maintained in the depth image of the frontalized face of the user.

The first feature vector may be extracted from a first image generated based on the enrolled image and a first confidence map corresponding to the enrolled image and may be stored in advance in an enrollment database.

The processor may be configured to calculate the second confidence map corresponding to the input image using a neural network that outputs a confidence map including confidence values, for authenticating a user included in a training image, corresponding to pixels with values maintained in a depth image of a frontalized face of the user included in the training image among pixels included in the training image.

The processor may be configured to generate the second image implying a depth confidence and depth information of each pixel, through an operation performed between the input image and the second confidence map, and to extract the second feature vector from the second image.

The processor may be configured to perform authentication of the user by comparing a similarity value between the first feature vector and the second feature vector to a predetermined threshold.

The processor may be configured to calculate a similarity value between the first feature vector and the second feature vector.

The processor may be configured to initially perform authentication of the user based on a correlation between a first feature extracted from the enrolled image and a second feature extracted from the input image.

The processor may be configured to secondarily perform authentication of the user based on the correlation between the first feature vector and the second feature vector, in response to the initially performed authentication of the user failing.

In another general aspect, a method includes calculating a first confidence map that corresponds to a pre-stored image of a first person by applying the pre-stored image to a first neural network; calculating a second confidence map that corresponds to a newly-acquired image of a second person by applying the newly-acquired image to a second neural network; generating a first image by applying the pre-stored image to the first confidence map; generating a second image by applying the newly-acquired image to the second confidence map; and determining whether the first person is the same as the second person by comparing a first feature extracted from the first image with a second feature extracted from the second image.

The pre-stored image may be a frontalized facial image of the first person and the newly-acquired image may be a frontalized facial image of the second person.

Generating the first image may include performing a pixel-based element-wise operation between the pre-stored image and the first confidence map.

Generating the second image may include performing a pixel-based element-wise operation between the newly-acquired image and the second confidence map.

Other features and aspects will be apparent from the following detailed description, the drawings, and the claims.

Figure 1:
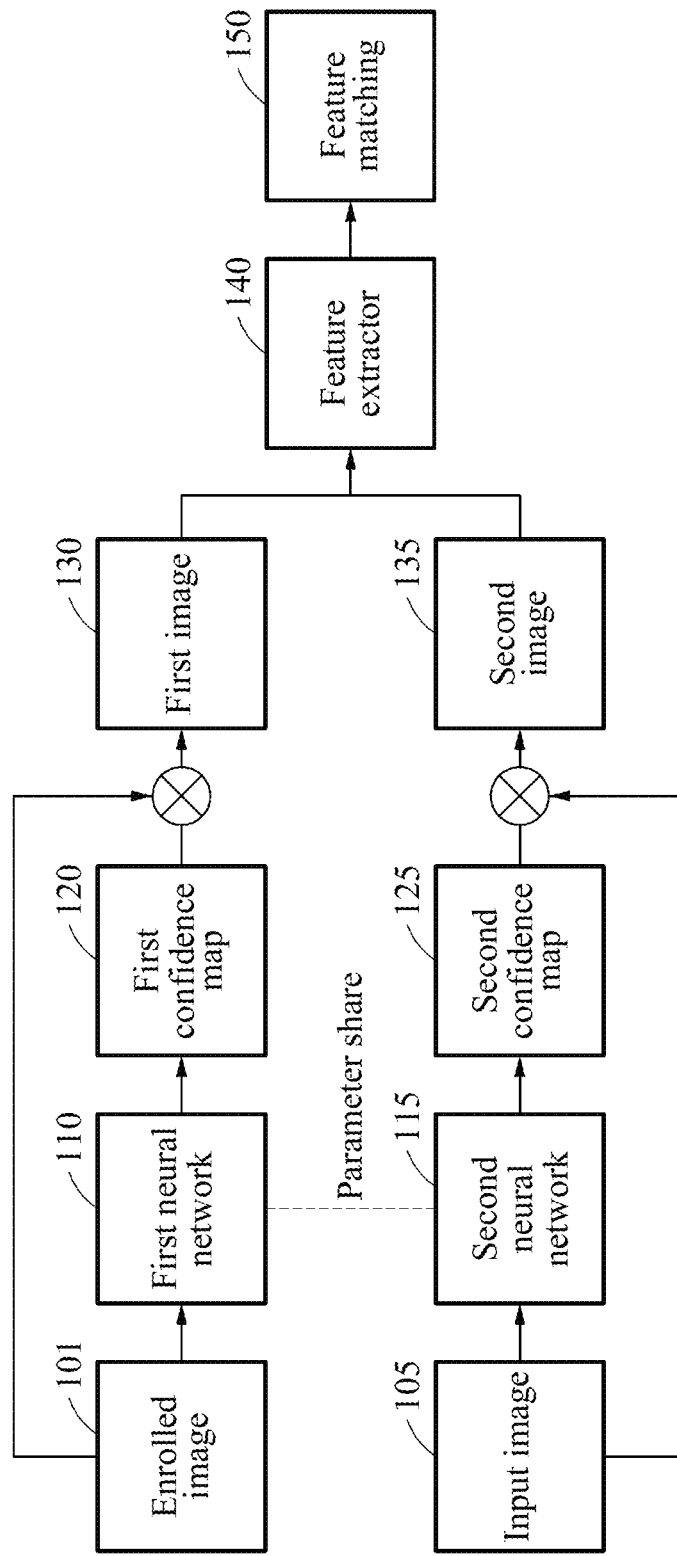
FIG. 1 illustrates an example of a user authentication process.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout.

FIG. 1 illustrates an example of a user authentication process. Referring to FIG. 1, a user authentication apparatus performs a user authentication using a neural network that estimates a confidence map representing a pixel confidence of an input image based on depth information of an image.

A neural network is a neural network that is trained in advance to output a confidence map that include confidence values corresponding to a portion of pixels included in an image. The portion of the pixels may include pixels that have values, for example, depth values, maintained in a depth image of a frontalized face of a user. The "pixels with the values maintained in the depth image of the frontalized face of the user" may correspond to, for example, pixels corresponding to a right face portion in which pixels are maintained in an image 350 of FIG. 3, and excluding a left face portion that is marked in black due to a loss of pixels in the image 350. Also, the confidence values corresponding to the portion of the pixels may be used to authenticate a user.

For example, the user authentication apparatus calculates a first confidence map 120 corresponding to an enrolled image 101 by applying the enrolled image 101 to a first neural network 110. The enrolled image 101 corresponds to an image that is enrolled in advance in an enrollment database (DB) for a user authentication. The enrolled image 101 may correspond to, for example, a frontalized facial image of a user. The user authentication apparatus generates a first image 130 based on both the enrolled image 101 and the first confidence map 120. For example, the user authentication apparatus may generate the first image 130 through an operation performed between the enrolled image 101 and the first confidence map 120. The operation performed between the enrolled image 101 and the first confidence map 120 may include, but is not limited to, for example, a pixel-based element-wise operation, such as an element-wise multiplying operation or an element-wise weighted sum. When it is difficult to store the enrolled image 101 itself in the enrollment DB due to a security, a feature extracted from the enrolled image 101 or a feature extracted from the first image 130 may be stored in the enrollment DB, which will be described below.

The user authentication apparatus applies an input image 105 input for a user authentication to a second neural network 115 and calculates a second confidence map 125 corresponding to the input image 105. A parameter of the first neural network 110 and a parameter of the second neural network 115 may be shared with each other. For example, the first neural network 110 and the second neural network 115 may be two instances of the same neural network model.

The input image 105 corresponds to, for example, an image obtained by frontalizing an image captured by a camera or an image sensor included in the user authentication apparatus. For example, a face of a user in a depth image acquired by capturing the face of the user may not be a frontal face. In this example, as a preprocessing operation, a face area of the user may be detected, feature points may be extracted from the detected face area, and the face of the user in the depth image may be rotated to a frontal face based on the extracted feature points.

The input image 105 includes at least a portion of the face of the user. For example, since pixels corresponding to a portion hidden when the depth image is captured do not have depth values even though the face of the user is frontalized, the input image 105 may include depth values of pixels corresponding to a portion viewed when the depth image is captured.

The user authentication apparatus generates a second image 135 based on both the input image 105 and the second confidence map 125. For example, the user authentication apparatus may generate the second image 135 implying a depth confidence and depth information of each pixel, through an operation performed between the input image 105 and the second confidence map 125. The operation performed between the input image 105 and the second confidence map 125 may include, but is not limited to, for example, a pixel-based element-wise operation, such as an element-wise multiplying operation or an element-wise weighted sum.

The user authentication apparatus selectively increases a weight of a portion with a high confidence in each image by reflecting a confidence map corresponding to each of the enrolled image 101 and the input image 105, to perform a user authentication. Thus, an accuracy of a three-dimensional (3D) face recognition may be enhanced.

The user authentication apparatus extracts, using a feature extractor 140, a first feature corresponding to the first image 130 and a second feature corresponding to the second image 135. The feature extractor 140 is trained in advance to extract a feature vector including a feature of a face from an image. The first feature and/or the second feature may have, for example, a form of a one-dimensional (1 D) vector value or a form of a two-dimensional (2D) vector matrix.

The user authentication apparatus performs a user authentication through a feature matching 150 between the first feature and the second feature. The user authentication apparatus may perform a user authentication corresponding to the input image 105 through a feature matching, for example, a calculation of a feature distance between the first feature and the second feature, or a calculation of a similarity between the first feature and the second feature.

In an example, a confidence level of each area of an image may be measured by a confidence map, and a user authentication may be performed based on only information corresponding to a reliable area of the image. Through the above-described process, the user authentication apparatus may prevent an image from being distorted when information lost due to a frontalization is artificially filled, and may enhance the accuracy of the 3D face recognition.

Figure 2:
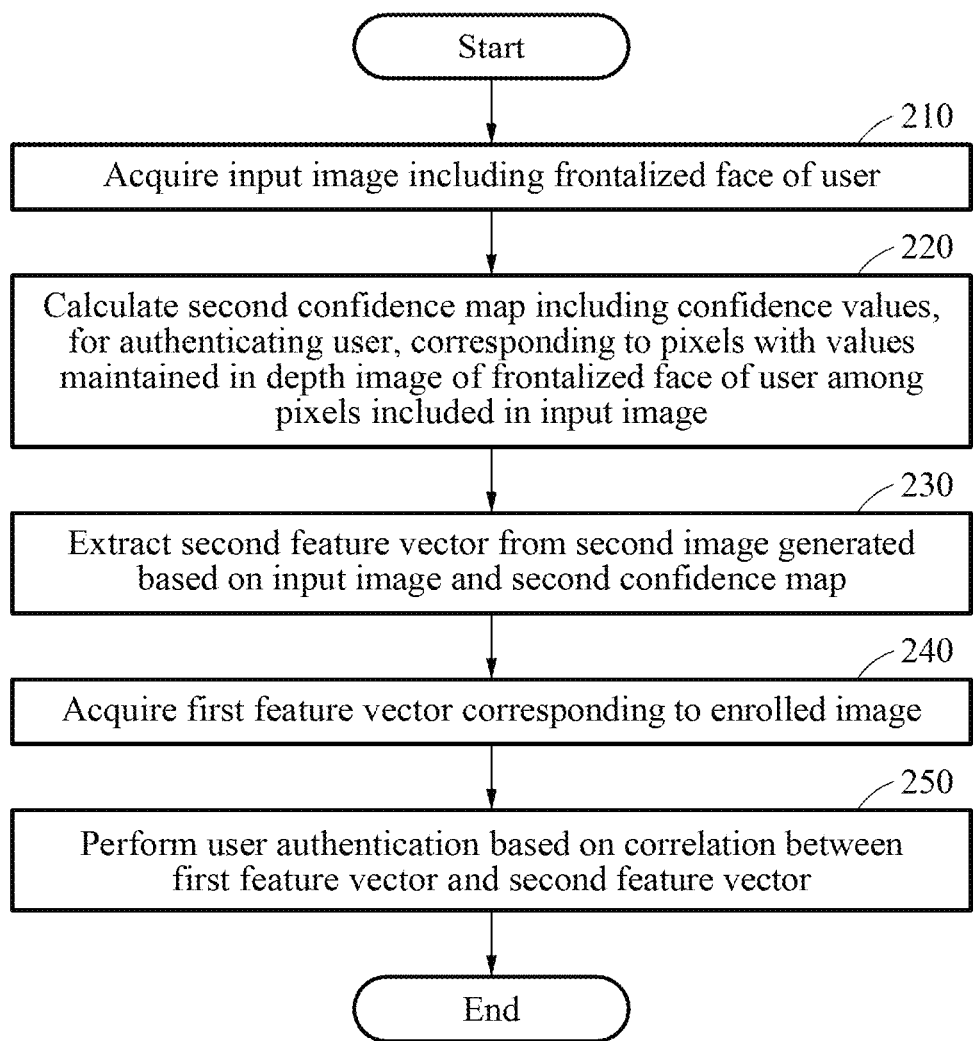
FIG. 2 is a flowchart illustrating an example of a user authentication method.

FIG. 2 is a flowchart illustrating an example of a user authentication method. Referring to FIG. 2, in operation 210, a user authentication apparatus acquires an input image including a frontalized face of a user. The input image is, for example, an image including a face of a user frontalized through a preprocessing process that will be described below with reference to FIG. 3. The input image includes pixels with values maintained in a depth image of the frontalized face of the user. An example of acquiring the input image will be further described below with reference to FIG. 3. An example of the input image will be described below with reference to FIG. 4.

In operation 220, the user authentication apparatus calculates a second confidence map including confidence values, for authenticating the user, corresponding to pixels with values maintained in a depth image of the frontalized face of the user among pixels included in the input image. For example, the user authentication apparatus may calculate a second confidence map corresponding to the input image using a pre-trained neural network. In this example, the neural network may be a neural network trained to output a confidence map including confidence values, for authenticating a user included in a training image, corresponding to pixels with values maintained in a depth image of a frontalized face of the user included in the training image among pixels included in the training image. The neural network may be referred to as a "confidence network" because the neural network outputs the confidence map. Examples of a confidence map will be further described below with reference to FIG. 5.

In operation 230, the user authentication apparatus extracts a second feature vector from a second image generated based on the input image and the second confidence map. For example, the user authentication apparatus may generate a second image implying a depth confidence and depth information of each pixel, through an operation performed between the input image and the second confidence map. In this example, the operation may include, for example, a pixel-based element-wise operation and a variety of other operations. The user authentication apparatus may extract the second feature vector from the second image. As an example of the second image, a second image 630 of FIG. 6 may be provided.

In operation 240, the user authentication apparatus acquires a first feature vector corresponding to an enrolled image. The first feature vector is extracted from a first image generated based on the enrolled image and a first confidence map corresponding to the enrolled image and is stored in advance in an enrollment DB. As an example of the first image, a first image 610 of FIG. 6 may be provided.

In operation 250, the user authentication apparatus performs a user authentication based on a correlation between the first feature vector and the second feature vector. The correlation includes a similarity between the first feature vector and the second feature vector, and may include, for example, a normalized cosine correlation (NCC) or a Euclidean distance.

In operation 250, the user authentication apparatus determines whether the user included in the input image is a pre-enrolled user, based on, for example, a degree of the correlation between the first feature vector and the second feature vector.

For example, the user authentication apparatus may calculate an NCC value between the first feature vector and the second feature vector. An NCC is a method of measuring a geometric similarity between an original image and an input image based on brightness and/or various values. In the NCC value, an independence of a correlation value for a linear brightness change may be maintained, for example, when all pixel brightness values of the original image and/or the input image are multiplied by a predetermined constant or when a predetermined constant value is added to all pixel brightness values of the original image and/or the input image.

Figure 3:
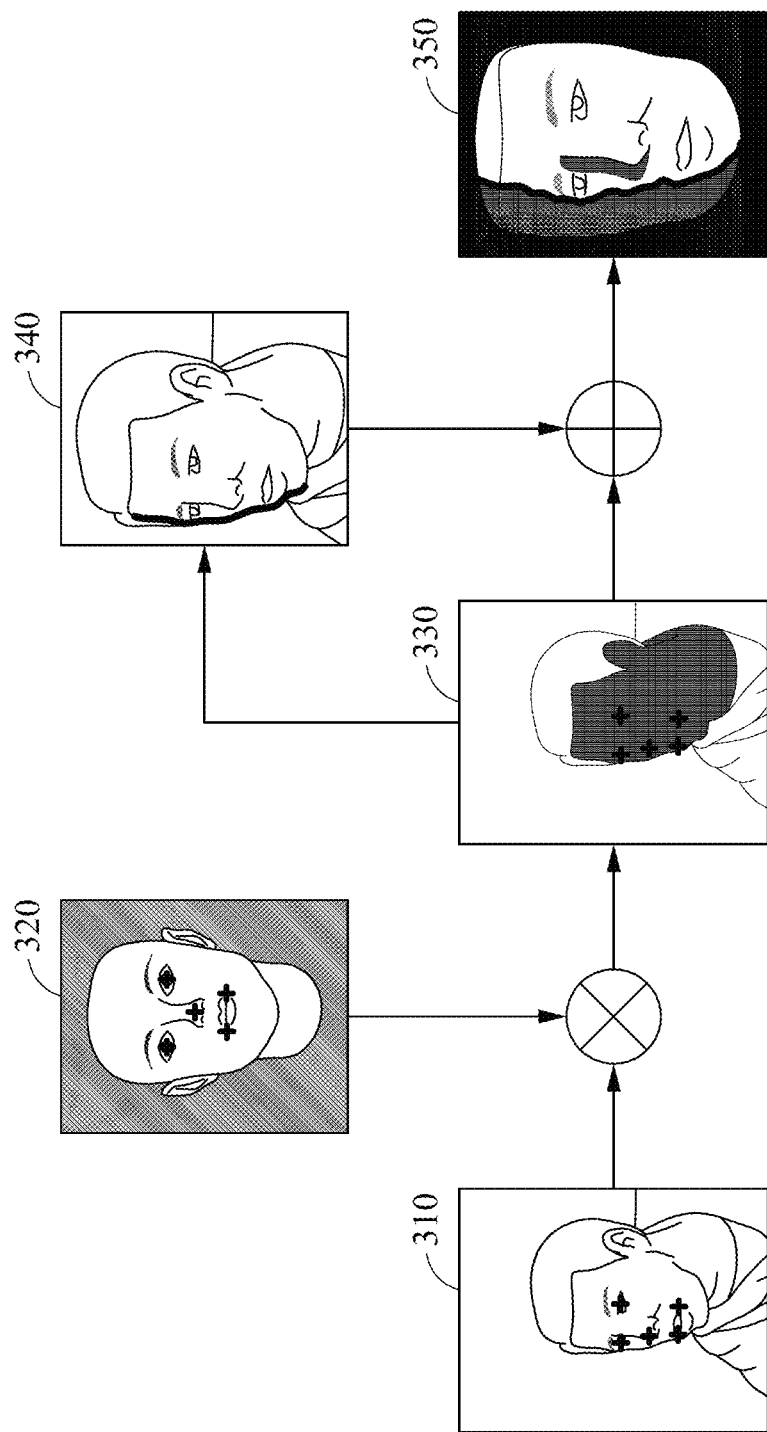
FIG. 3 illustrates an example of a process of acquiring an input image.

FIG. 3 illustrates an example of a process of acquiring an input image. FIG. 3 illustrates a preprocessing process of frontalizing a face of a user by a user authentication apparatus. The preprocessing process is performed on an input image before the user authentication apparatus acquires the input image in operation 210 of FIG. 2. In the following description, the preprocessing process is performed by the user authentication apparatus for convenience of description. However, examples are not limited thereto, and the preprocessing process may also be performed by a separate pre-processor.

For example, a 2D image, for example, a depth image, including a side face of a user is assumed to be input. The user authentication apparatus detects a face area of a user from the 2D image, and detects feature points, for example, landmarks in operation 310. The landmarks are detected from, for example, pupils of both eyes, an end of a nose or both ends of a mouth of the user.

In operation 320, the user authentication apparatus calls a 3D generic reference model. The 3D generic reference model corresponds to, for example, a 3D model of an average face of ordinary people.

In operation 330, the user authentication apparatus projects the landmarks detected from the 2D image in operation 310 to the 3D generic reference model called in operation 320. Through operation 330, the user authentication apparatus places the 2D image in a desired position of the 3D generic reference model.

In operation 340, the user authentication apparatus detects a borderline between a background and the 3D generic reference model to which the landmarks are projected in operation 330.

In operation 350, the user authentication apparatus combines the 3D generic reference model to which the landmarks are projected in operation 330 with the borderline detected in operation 340, rotates the 3D generic reference model combined with the borderline, and frontalizes a facial image. A border of a portion that is invisible on the side face in the facial image frontalized in operation 350 may be ruggedly represented. Since edge information of a face corresponding to the borderline is used as an important factor for extracting of a feature of a face, an unevenly distorted surface may reduce a face recognition performance.

Thus, an input image obtained by frontalizing a depth image including depth values of pixels is converted into an image that is more robust to a 3D face recognition through the confidence network. The user authentication apparatus performs a face recognition by weighting a reliable area instead of filling an empty portion of a frontalized face.

Figure 4:
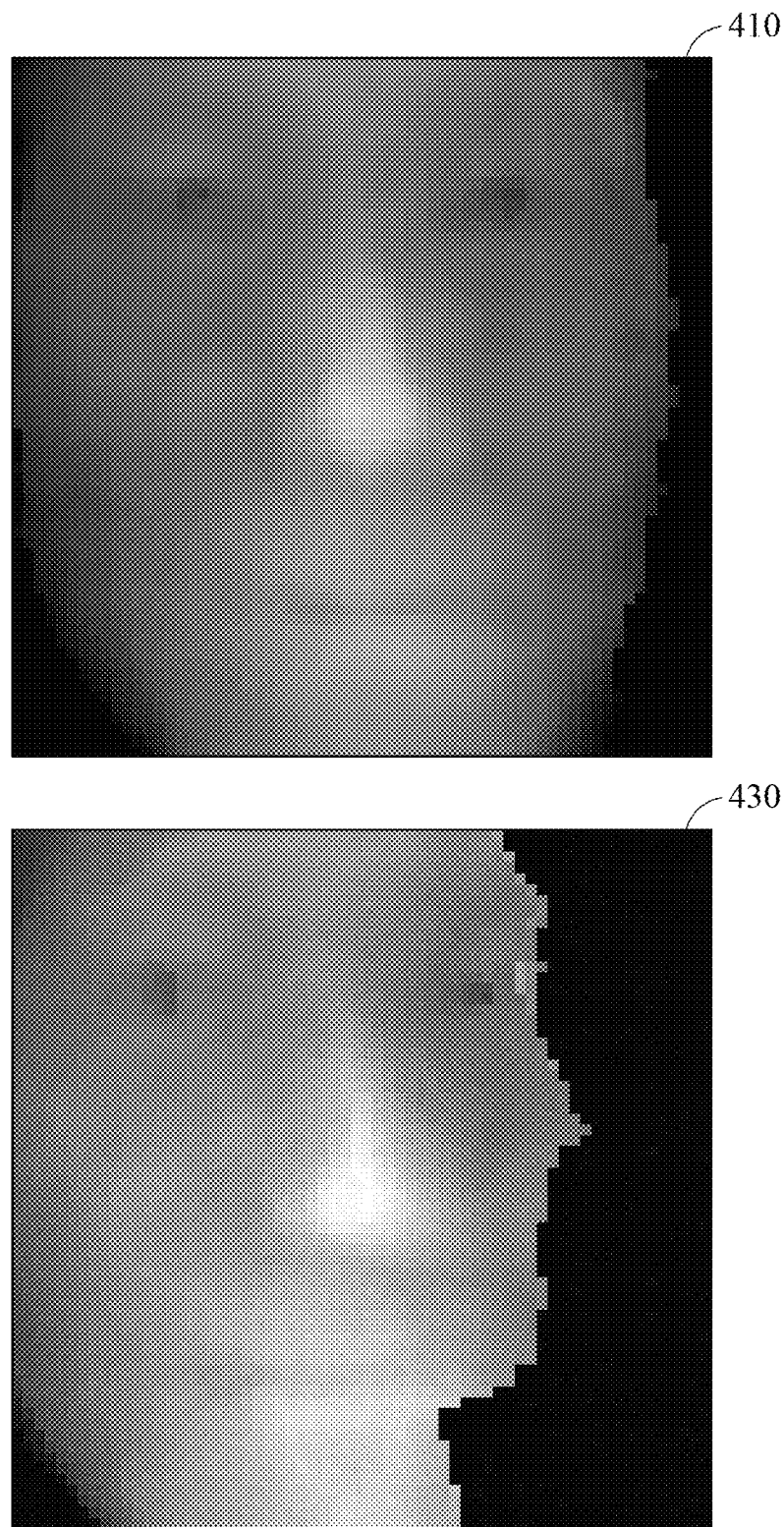
FIG. 4 illustrates an example of an input image and an example of an enrolled image.

FIG. 4 illustrates an example of an input image and an example of an enrolled image. FIG. 4 illustrates an enrolled image 410 and an input image 430.

The enrolled image 410 corresponds to an image enrolled in advance in an enrollment DB for a user authentication. As described above, when a first image is generated from the enrolled image 410, a first feature is extracted from the first image for security reasons, the first feature, instead of the enrolled image 410, is stored in the enrollment DB.

The enrolled image 410 generally corresponds to a frontal facial image of a user acquired through an enrollment process of an image for an initial user authentication in a user authentication apparatus. In general, when a user gazes directly at a camera during an enrollment, the enrolled image 410 may be obtained instead of passing through a separate frontalization process, and may include all face portions. The enrolled image 410 may be, for example, a depth image acquired by a depth camera.

The input image 430 includes pixels with values, for example, depth values, maintained in a depth image of a frontalized face of a user. The input image 430 may be, for example, a depth image including depth values of pixels corresponding to at least a portion of a face of a user. For example, the input image 430 may be generated through a preprocessing process of frontalizing a depth image of a side face.

Figure 5:
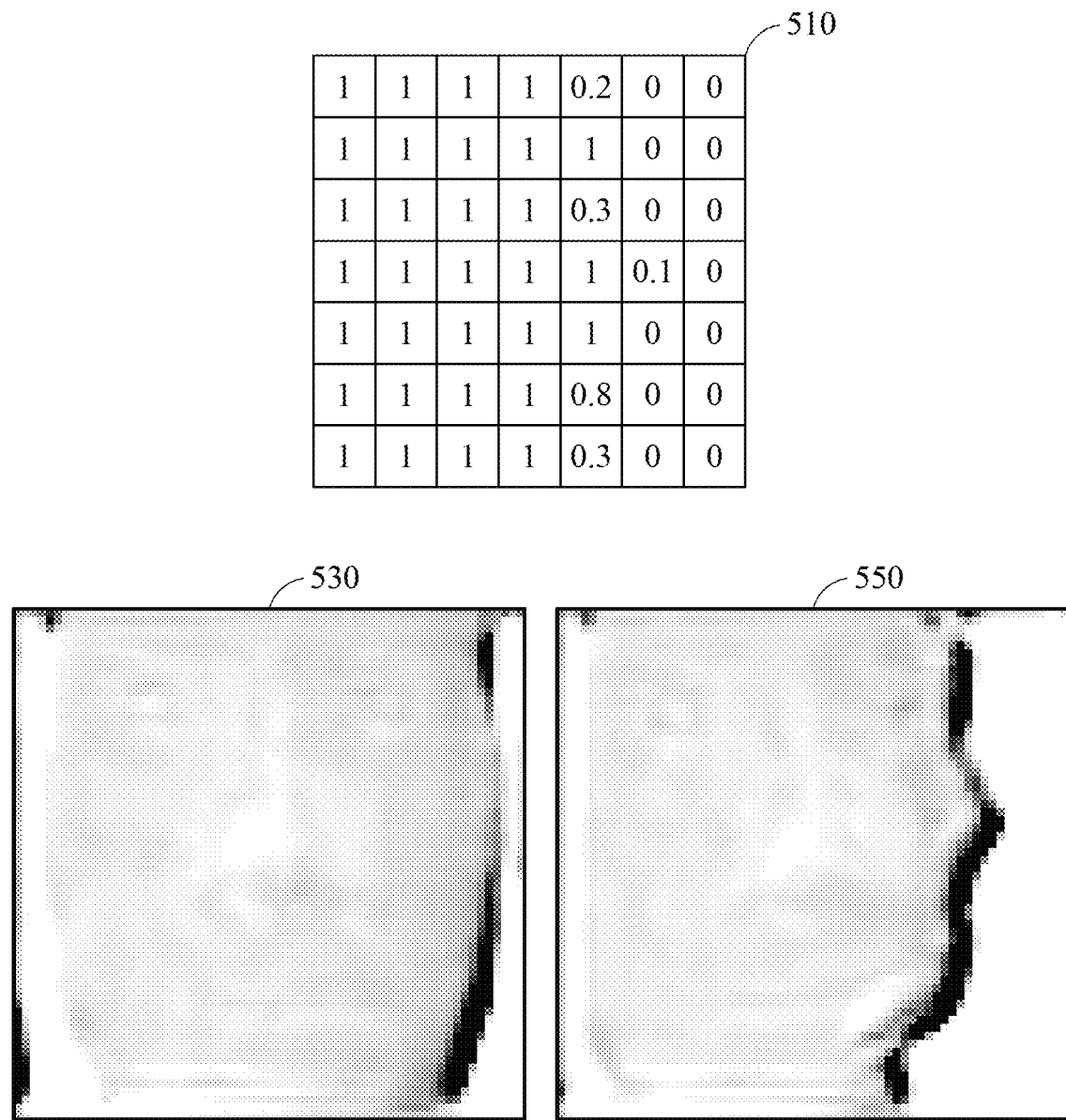
FIG. 5 illustrates examples of a confidence map.

FIG. 5 illustrates examples of a confidence map. FIG. 5 illustrates confidence maps 510, 530 and 550.

A user authentication apparatus outputs a confidence map including confidence values for a user authentication, using a pre-trained neural network.

The user authentication apparatus calculates the confidence map 510 that represents confidence values of pixels in a form of a matrix. The confidence map 510 may be, for example, a confidence map corresponding to a portion of an input image. A total size of the confidence map 510 may be, for example, a "width of an input image×a height of the input image". A confidence value in the confidence map 510 may range from "0" to "1". "1" indicates a highest confidence value and "0" indicates a lowest confidence value.

The first confidence map 530 and the second confidence map 550 are examples of visually displaying confidence values. The first confidence map 530 is a confidence map corresponding to an enrolled image and includes confidence values corresponding to pixels corresponding to an entire face area. The second confidence map 550 is a confidence map corresponding to an input image and includes confidence values corresponding to pixels with values maintained due to a frontalization of a face of a user.

For example, when confidence values corresponding to pixels in the first confidence map 530 and the second confidence map 550 increase, the pixels may be displayed in colors close to white. When the confidence values corresponding to the pixels decrease, the pixels may be displayed in colors close to black. Also, due to an occlusion or a distortion in the first confidence map 530 and the second confidence map 550, pixels that do not have depth values are displayed in colors corresponding to null or don't care.

Figure 6:
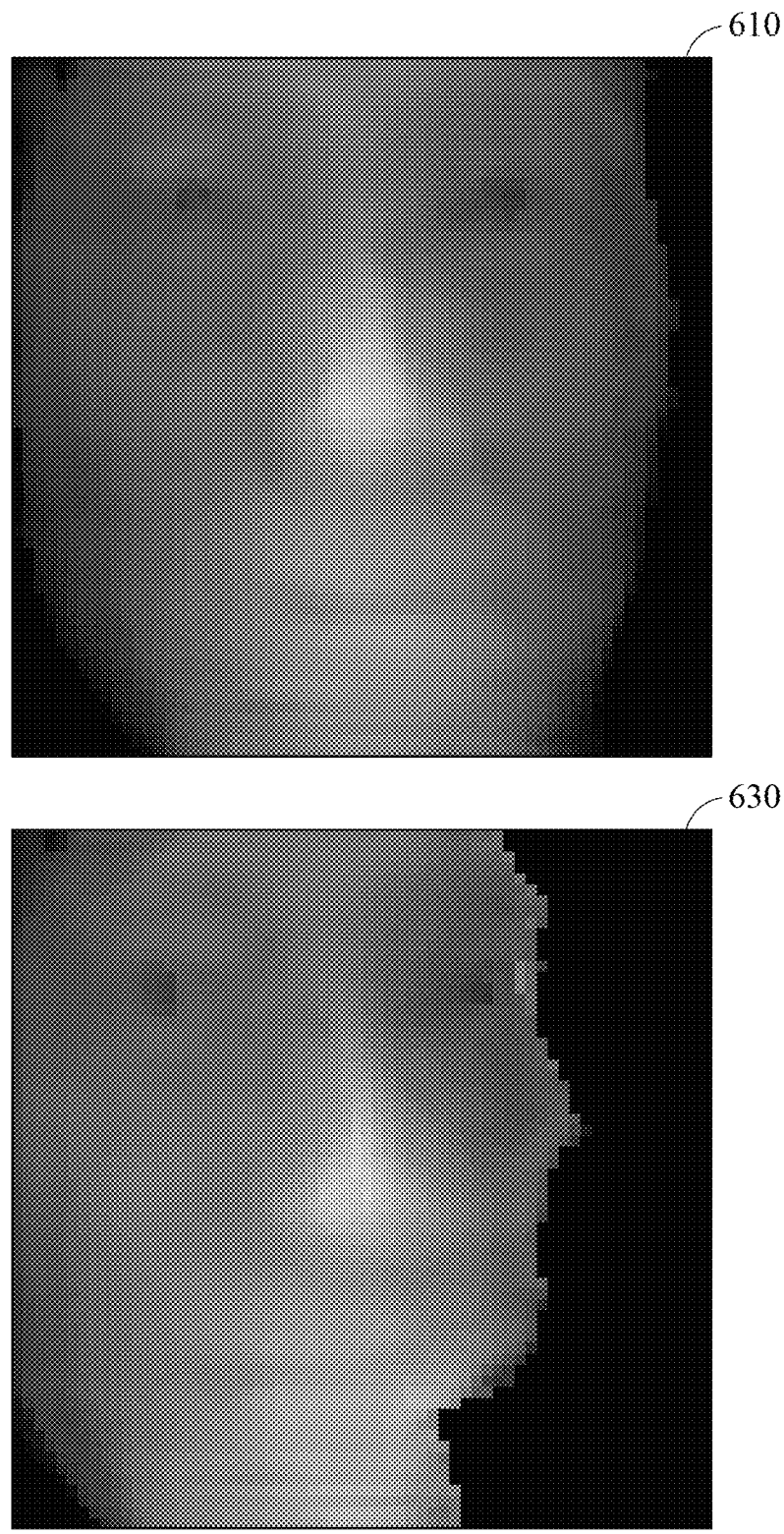
FIG. 6 illustrates an example of a first image and an example of a second image.

FIG. 6 illustrates an example of a first image and an example of a second image. FIG. 6 illustrates the first image 610 and the second image 630.

The first image 610 corresponds to an image obtained by pixel-wise multiplying the first confidence map 530 by the above-described enrolled image 410, and the second image 630 corresponds to an image obtained by pixel-wise multiplying the second confidence map 550 by the above-described input image 430. For example, a user authentication apparatus may extract features from reliable information of the first image 610 and the second image 630 to prevent a recognition rate from being reduced due to an occlusion or a distortion.

Figure 7:
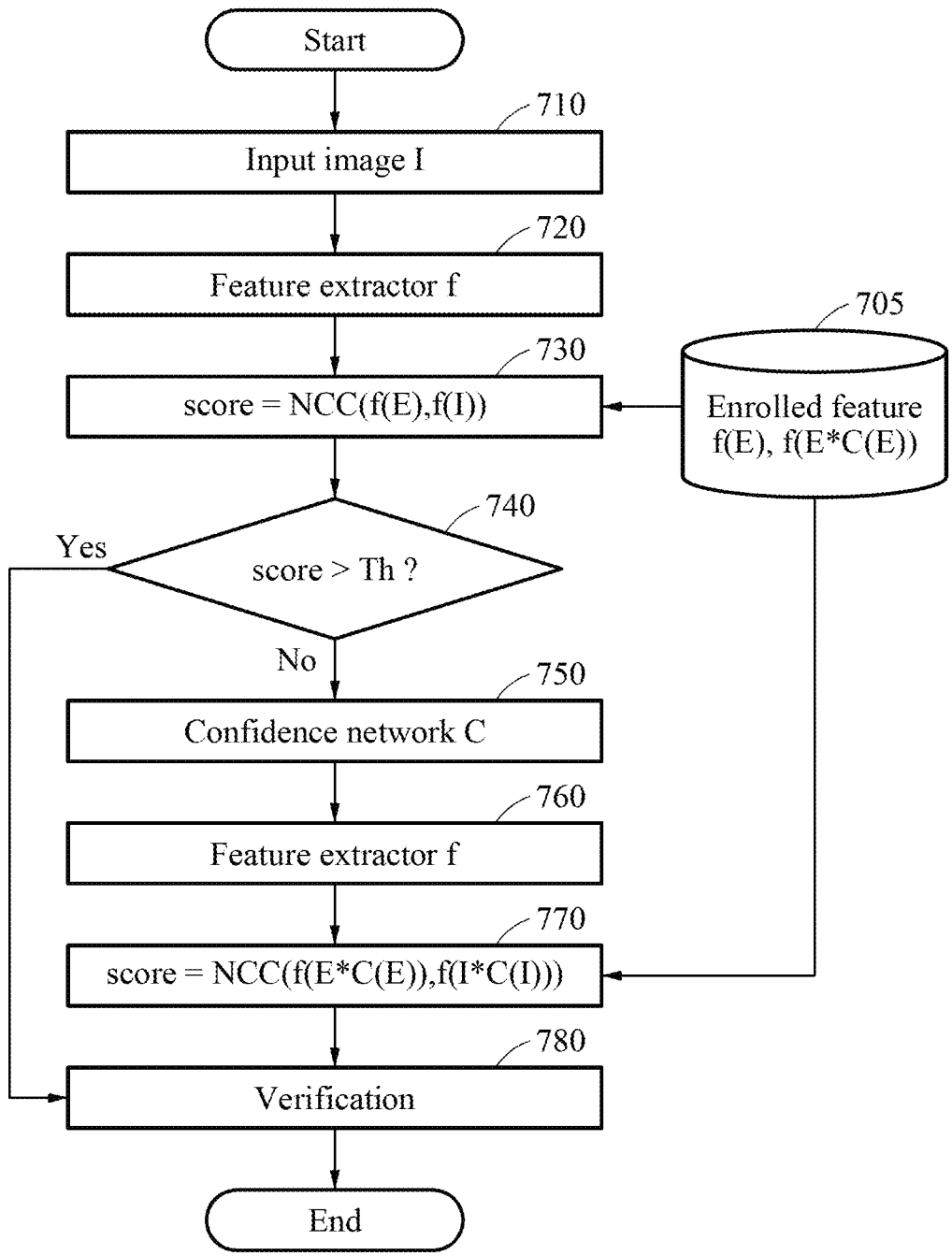
FIG. 7 is a flowchart illustrating another example of a user authentication method.

FIG. 7 is a flowchart illustrating another example of a user authentication method. Referring to FIG. 7, in operation 710, a user authentication apparatus acquires an input image I. The input image I includes a frontalized face of a user.

In operation 720, the user authentication apparatus extracts a first feature f(I) from the input image I using a first feature extractor. The first feature extractor is a feature extractor trained in advance to extract a feature or a feature vector from an image.

In operation 730, the user authentication apparatus acquires a second feature f(E) that is extracted from an enrolled image and stored in advance from an enrollment DB 705, and calculates a first similarity score based on a correlation between the first feature f(I) and the second feature f(E). For example, the user authentication apparatus may calculate an NCC value between the first feature f(I) and the second feature f(E) and determine the NCC value as the first similarity score.

The user authentication apparatus primarily performs a user authentication based on the first similarity score. For example, in operation 740, the user authentication apparatus determines whether the first similarity score is greater than a first authentication threshold (Th). When the first similarity score is determined to be greater than the first authentication threshold in operation 740, the user authentication apparatus verifies whether the user authentication succeeds based on the first similarity score in operation 780.

When the first similarity score is determined to be less than or equal to the first authentication threshold in operation 740, the user authentication apparatus estimates a confidence map, for example, a second confidence map, corresponding to the input image I using a confidence network C in operation 750. The confidence map includes confidence values, for authenticating the user, corresponding to pixels with values maintained in a depth image of the frontalized face of the user among pixels included in the input image I.

When the user authentication primarily performed based on the first similarity score fails, the user authentication apparatus secondarily performs the user authentication by applying the confidence map. Thus, an authentication efficiency together with an authentication performance may be enhanced.

In operation 760, the user authentication apparatus extracts, using a pre-trained second feature extractor, a second feature vector from a second image generated based on the input image I and the second confidence map. The second feature extractor may be identical to or different from the first feature extractor.

In operation 770, the user authentication apparatus calculates a second similarity score based on a correlation between a first feature vector acquired from the enrollment DB 705 and the second feature vector extracted in operation 760. The first feature vector is extracted from a first image generated based on an enrolled image and a first confidence map corresponding to the enrolled image and is stored in advance. The first feature vector may be, for example, f(E*C(E)), and the second feature vector may be, for example, f(I*C(I)). In operation 770, the user authentication apparatus calculates an NCC value between the first feature vector f(E*C(E)) and the second feature vector f(I*C(I)) and determines the NCC value as the second similarity score.

In operation 780, the user authentication apparatus verifies whether the user authentication succeeds based on the second similarity score calculated in operation 770. In an example, when the second similarity score is greater than a second authentication threshold, the user authentication apparatus outputs a result indicating that an authentication of the user succeeds. In another example, when the second similarity score is less than or equal to the second authentication threshold, the user authentication apparatus outputs a result indicating that the authentication of the user fails. The second authentication threshold may be identical to or different from the first authentication threshold.

Figure 8:
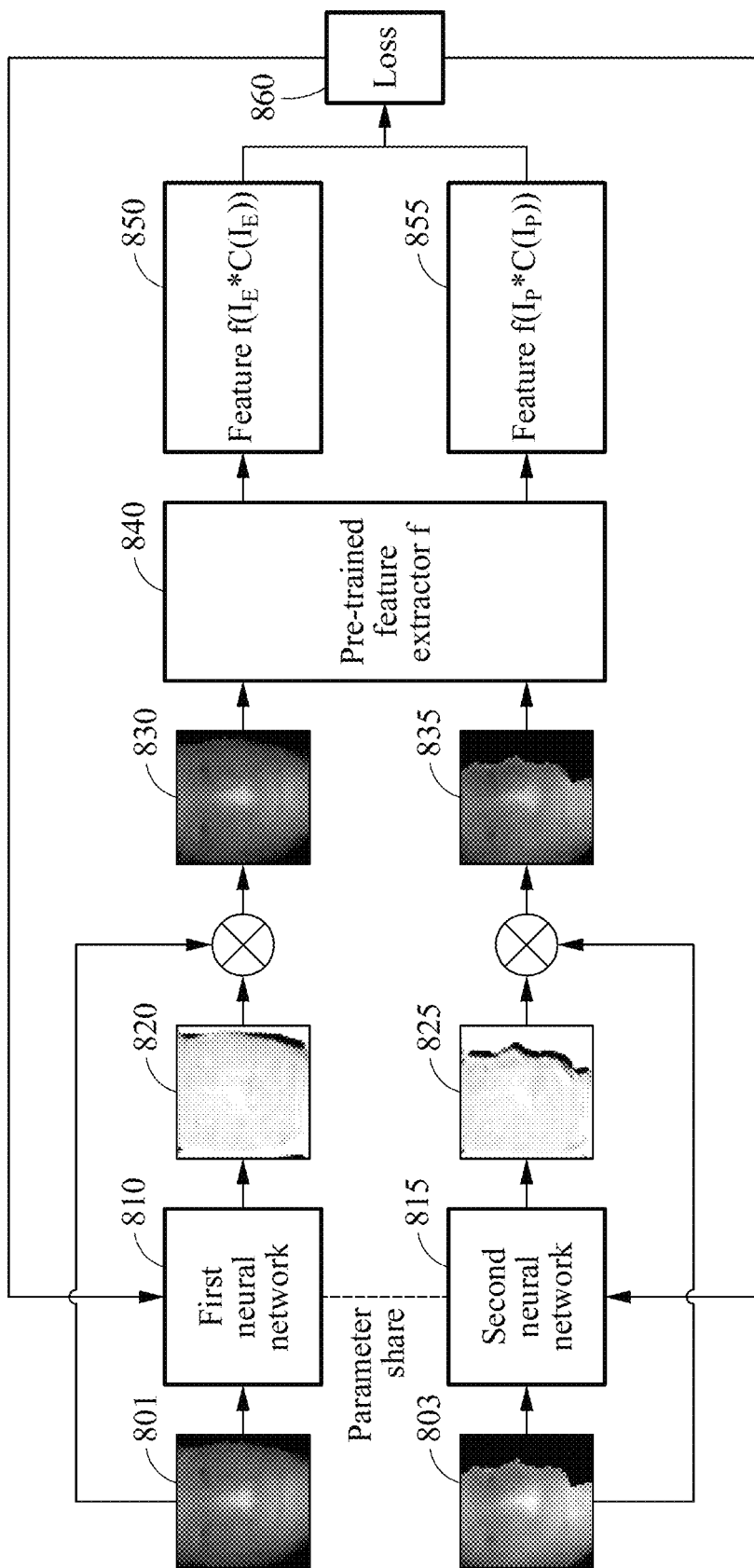
FIG. 8 illustrates an example of a training method for a user authentication.

FIG. 8 illustrates an example of a training method for a user authentication. FIG. 8 illustrates a training process using a first training image 801 and a second training image 803.

A training apparatus estimates, using a first neural network 810 that is being trained, a first confidence map 820 that includes confidence values, for authenticating a user included in the first training image 801, corresponding to pixels with values maintained in a depth image of a frontalized face of the user among pixels included in the first training image 801.

When the second training image 803 including the frontalized face of the user is acquired, the training apparatus calculates a second confidence map 825, using a second neural network 815 that is being trained. The second confidence map 825 includes confidence values, for authenticating a user included in the second training image 803, corresponding to pixels with values maintained in a depth image of the frontalized face of the user among pixels included in the second training image 803. The first neural network 810 and the second neural network 815 may be instances of the same neural network model, and may be trained to share parameters with each other.

The training apparatus extracts, using a feature extractor 840, a first feature vector $f(I_E*C(I_E))$ 850 from a first image 830 that is generated based on the first training image 801 and the first confidence map 820 and extracts, using the feature extractor 840, a second feature vector $f(I_P*C(I_P))$ 855 from a second image 835 that is generated based on the second training image 803 and the second confidence map 825.

The training apparatus updates the first neural network 810 and the second neural network 815 by a backpropagation of a loss 860 that is based on a correlation between the first feature vector 850 and the second feature vector 855. For example, the loss 860 based on the correlation between the first feature vector 850 and the second feature vector 855 may be obtained by a binary cross entropy model as shown in Equation 1 below.

$$Loss_{conf} = -\frac{1}{N}\sum_{i=0}^{N} y_i \ln \hat{y}_i - (1-y_i)\ln(1-\hat{y}_i),$$ [Equation 1]

$$\text{where } \hat{y}_i = \frac{NCC+1}{2}$$

In Equation 1, N denotes a total number of training image pairs. $y_i$ may have a value of "1" when two users of an i-th pair of training images are the same person, and may have a value of "0" when the two users are different persons. $\hat{y}_i$ denotes a value in proportion to an NCC value between the training images forming the i-th pair.

The training apparatus adjusts parameters of the first neural network 810 and the second neural network 815 based on the loss 860.

Figure 9:
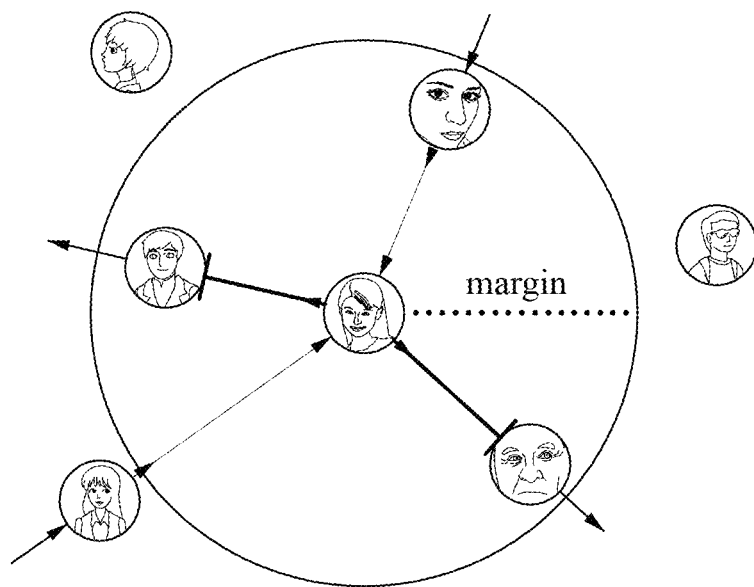
FIG. 9 illustrates an example of updating a neural network.

FIG. 9 illustrates an example of updating a neural network. A training apparatus calculates a loss for maximizing a contrastive loss as shown in Equation 2 below, depending on whether a user of a first training image and a user of a second training image are the same person or different persons.

$$(1-Y)\frac{1}{2}(D_W)^2 + (Y)\frac{1}{2}\{\max(0, m-D_W)\}^2$$ [Equation 2]

In Equation 2, Y denotes a value indicating whether a pair of the first training image and the second training image is a homogeneous pair or a heterogeneous pair. $D_W$ denotes a distance between feature vectors of the first training image and the second training image. Also, m denotes a margin. The margin is a value designed such that a heterogeneous pair exceeding the margin does not contribute to a loss. In other words, when a distance between feature vectors of the first training image and the second training image in the heterogeneous pair is sufficiently long, the heterogeneous pair may not be included in a loss value. In an example of a heterogeneous pair, a maximum value among values of "0" and "m–$D_W$" may be used. In a relationship of the heterogeneous pair, when a distance between feature vectors exceeds the margin m, a corresponding pair may not contribute to a loss.

When the first training image and the second training image represent the same person, the training apparatus may train a neural network to output a confidence map that reduces a distance between the first training image and the second training image. When the first training image and the second training image represent different persons, the training apparatus may train the neural network to output a confidence map that increases the distance between the first training image and the second training image.

Figure 10:
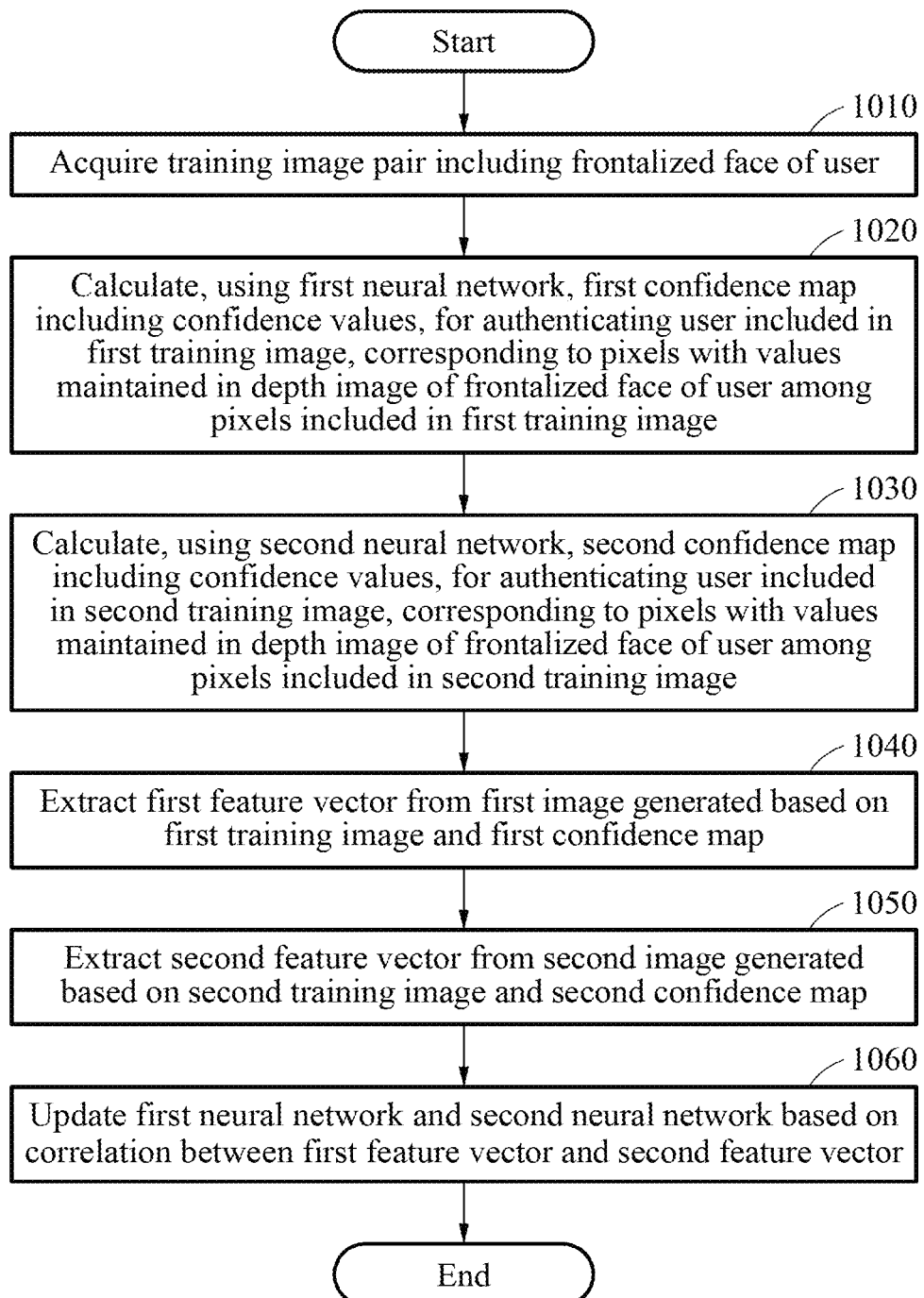
FIG. 10 is a flowchart illustrating an example of a training method for a user authentication.

FIG. 10 is a flowchart illustrating an example of a training method for a user authentication. Referring to FIG. 10, in operation 1010, a training apparatus acquires a training image pair including a frontalized face of a user. The training image pair includes a first training image and a second training image. At least one of the first training image and the second training image includes, for example, pixels that have values maintained in a depth image of the frontalized face of the user.

In operation 1020, the training apparatus calculates, using a first neural network that is being trained, a first confidence map including confidence values, for authenticating a user included in the first training image, corresponding to pixels with values maintained in a depth image of a frontalized face of the user among pixels included in the first training image.

In operation 1030, the training apparatus calculates, using a second neural network that is being trained, a second confidence map including confidence values for authenticating a user included in the second training image, corresponding to pixels with values maintained in a depth image of a frontalized face of the user among pixels included in the second training image.

In operation 1040, the training apparatus extracts a first feature vector from a first image generated based on the first training image and the first confidence map. The training apparatus may generate the first image through an operation performed between the first training image and the first confidence map. The training apparatus may extract the first feature vector from the first image.

In operation 1050, the training apparatus extracts a second feature vector from a second image generated based on the second training image and the second confidence map. The training apparatus may generate the second image implying a depth confidence and depth information of each pixel, through an operation performed between the second training image and the second confidence map. The training apparatus may extract the second feature vector from the second image.

In operation 1060, the training apparatus updates the first neural network and the second neural network based on a correlation between the first feature vector and the second feature vector. The first neural network and the second neural network may share parameters with each other.

Figure 11:
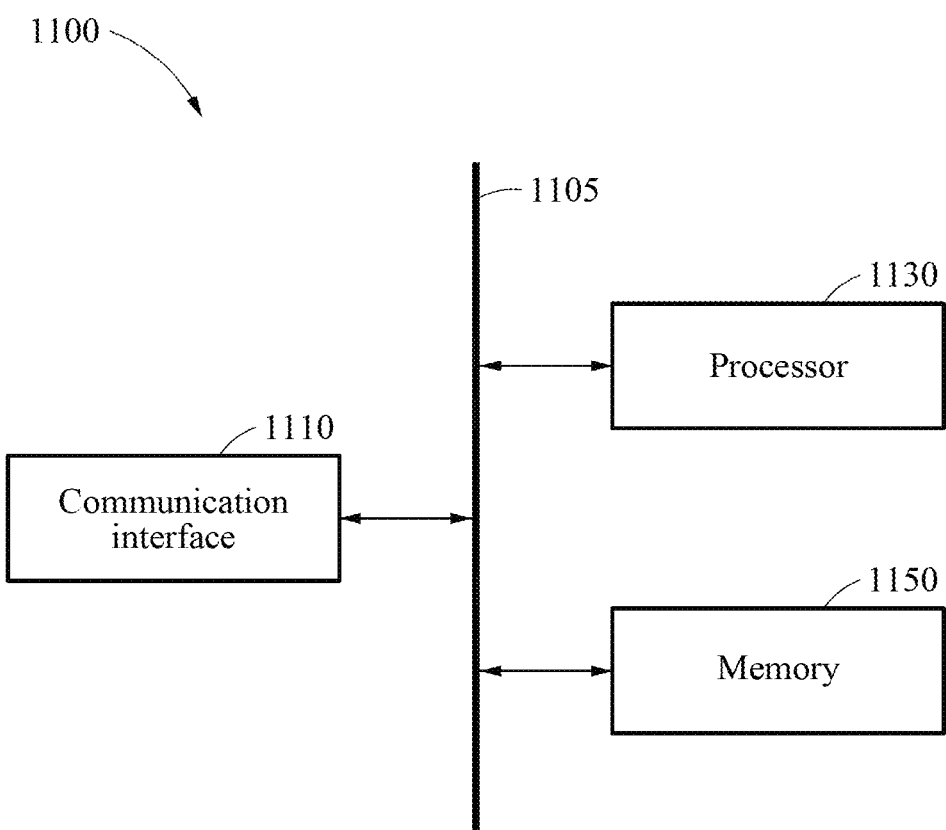
FIG. 11 illustrates an example of a user authentication apparatus.

FIG. 11 illustrates an example of a user authentication apparatus 1100. Referring to FIG. 11, the user authentication apparatus 1100 includes a communication interface 1110 and a processor 1130. The user authentication apparatus 1100 further includes a memory 1150. The communication interface 1110, the processor 1130 and the memory 1150 communicate with each other via a communication bus 1105.

The communication interface 1110 acquires an input image including a frontalized face of a user. Also, the communication interface 1110 acquires a first feature vector corresponding to an enrolled image.

The processor 1130 calculates a second confidence map including confidence values, for authenticating the user, corresponding to pixels with values maintained in a depth image of the frontalized face of the user among pixels included in the input image. The processor 1130 extracts a second feature vector from a second image generated based on the input image and the second confidence map. The processor 1130 performs a user authentication based on a correlation between the first feature vector and the second feature vector.

The memory 1150 stores the first feature vector that is acquired by the communication interface 1110 and that corresponds to the enrolled image. Also, the memory 1150 stores the input image and/or the second feature vector that corresponds to the input image and that is extracted by the processor 1130.

Also, the processor 1130 performs at least one of the methods described with reference to FIGS. 1 through 7 or an algorithm corresponding to at least one of the methods. The processor 1130 is a hardware-implemented data processing device having a circuit that is physically structured to execute desired operations. For example, the desired operations may include code or instructions included in a program. The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The processor 1130 executes a program and controls the user authentication apparatus 1100. Codes of the program executed by the processor 1130 are stored in the memory 1150.

The memory 1150 stores a variety of information generated in a processing process of the above-described processor 1130. Also, the memory 1150 stores a variety of data and programs. The memory 1150 includes, for example, a volatile memory or a non-volatile memory. The memory 1150 includes a high-capacity storage medium such as a hard disk, to store a variety of data.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method comprising:
   acquiring an input image comprising a frontalized face of a user, obtained by rotating a face of the user in a depth image, wherein the input image includes depth values of pixels corresponding to at least a portion of the face of the user viewed when the depth image was captured and includes pixels which correspond to a portion of the face of the user hidden when the depth image was captured, which do not have depth values;
   calculating a second confidence map comprising confidence values, for the pixels of the input image corresponding to at least the portion of the face of the user viewed when the depth image was captured among pixels included in the input image;
   extracting a second feature vector from a second image generated based on the input image and the second confidence map;
   acquiring a first feature vector corresponding to an enrolled image; and
   performing authentication of the user based on a correlation between the first feature vector and the second feature vector.

2. The method of claim 1, wherein the first feature vector is extracted from a first image generated based on the enrolled image and a first confidence map corresponding to the enrolled image and is stored in advance.

3. The method of claim 1, wherein calculating the second confidence map comprises calculating the second confidence map corresponding to the input image using a neural network that outputs a confidence map comprising confidence values for authenticating a user included in a training image, corresponding to pixels with values maintained in a depth image of a frontalized face of the user included in the training image among pixels included in the training image.

4. The method of claim 1, wherein extracting the second feature vector comprises:
   generating the second image implying a depth confidence and depth information of each pixel, through an operation performed between the input image and the second confidence map; and
   extracting the second feature vector from the second image.

5. The method of claim 1, wherein performing authentication of the user comprises comparing a degree of a correlation between the first feature vector and the second feature vector to a predetermined threshold.

6. The method of claim 1, wherein performing authentication of the user authentication comprises calculating a similarity value between the first feature vector and the second feature vector.

7. The method of claim 1, further comprising:
initially performing authentication of the user based on a correlation between a first feature extracted from the enrolled image and a second feature extracted from the input image.

8. The method of claim 7, wherein performing authentication of the user based on the correlation between the first feature vector and the second feature vector comprises, in response to the initially performed authentication of the user failing, secondarily performing authentication of the user.

9. The method of claim 8, wherein the first feature and the first feature vector are stored in advance in an enrollment database.

10. A non-transitory computer-readable storage medium storing instructions that, when executed by a processor, cause the processor to perform the method of claim 1.

11. An apparatus comprising:
a communication interface configured to acquire an input image comprising a frontalized face of a user, obtained by rotating a face of the user in a depth image, wherein the input image includes depth values of pixels corresponding to at least a portion of the face of the user viewed when the depth image was captured and includes pixels which correspond to a portion of the face of the user hidden when the depth image was captured, which do not have depth values, and to acquire a first feature vector corresponding to an enrolled image; and
a processor configured to calculate a second confidence map comprising confidence values, for the pixels of the input image corresponding to at least the portion of the face of the user viewed when the depth image was captured among pixels included in the input image, configured to extract a second feature vector from a second image generated based on the input image and the second confidence map, and configured to perform authentication of the user based on a correlation between the first feature vector and the second feature vector.

12. The apparatus of claim 11, wherein the first feature vector is extracted from a first image generated based on the enrolled image and a first confidence map corresponding to the enrolled image and is stored in advance in an enrollment database.

13. The apparatus of claim 11, wherein the processor is configured to calculate the second confidence map corresponding to the input image using a neural network that outputs a confidence map comprising confidence values, for authenticating a user included in a training image, corresponding to pixels with values maintained in a depth image of a frontalized face of the user included in the training image among pixels included in the training image.

14. The apparatus of claim 11, wherein the processor is configured to generate the second image implying a depth confidence and depth information of each pixel, through an operation performed between the input image and the second confidence map, and to extract the second feature vector from the second image.

15. The apparatus of claim 11, wherein the processor is configured to perform authentication of the user by comparing a similarity value between the first feature vector and the second feature vector to a predetermined threshold.

16. The apparatus of claim 11, wherein the processor is configured to calculate a similarity value between the first feature vector and the second feature vector.

17. The apparatus of claim 11, wherein the processor is configured to initially perform authentication of the user based on a correlation between a first feature extracted from the enrolled image and a second feature extracted from the input image.

18. The apparatus of claim 17, wherein the processor is configured to secondarily perform authentication of the user based on the correlation between the first feature vector and the second feature vector, in response to the initially performed authentication of the user failing.

* * * * *